United States Patent
Czapka et al.

(10) Patent No.: US 9,706,705 B2
(45) Date of Patent: Jul. 18, 2017

(54) TWIN-ROW MULTIPLE SEED-TYPE PLANTER

(71) Applicant: CNH Industrial America LLC, New Holland, PA (US)

(72) Inventors: Jason T. Czapka, Munster, IN (US); Benjamin A. Coats, Antiock, IL (US)

(73) Assignee: CNH Industrial America LLC, New Holland, PA (US)

( * ) Notice: Subject to any disclaimer, the term of this patent is extended or adjusted under 35 U.S.C. 154(b) by 194 days.

(21) Appl. No.: 14/568,572

(22) Filed: Dec. 12, 2014

(65) Prior Publication Data
US 2016/0165794 A1    Jun. 16, 2016

(51) Int. Cl.
A01C 7/04      (2006.01)
A01C 19/02     (2006.01)
A01C 21/00     (2006.01)

(52) U.S. Cl.
CPC ............ *A01C 21/005* (2013.01); *A01C 7/046* (2013.01); *A01C 19/02* (2013.01)

(58) Field of Classification Search
CPC ......... A01C 7/046; A01C 7/044; A01C 7/042; A01C 7/04; A01C 7/00; A01C 19/02; A01C 19/00; A01C 21/005; A01C 21/00
See application file for complete search history.

(56) References Cited

U.S. PATENT DOCUMENTS

| | | | |
|---|---|---|---|
| 5,915,313 A | 6/1999 | Bender et al. | |
| 6,058,351 A | 5/2000 | McCauley | |
| 6,216,614 B1 | 4/2001 | Wollenhaupt | |
| 6,845,724 B2 | 1/2005 | Mayerle et al. | |
| 7,353,760 B2 | 4/2008 | Mayerle et al. | |
| 8,543,238 B2 | 9/2013 | Straeter | |
| 2011/0054743 A1 | 3/2011 | Kocer et al. | |

OTHER PUBLICATIONS mhtml:file://W:\Docs\01016\359\References\00778972.mht; Prototype Planter Arrives; 6 pages; Oct. 16, 2014.
http://farmindustrynews.com/print/planters/closer-look-industry-s-first-multi-hybrid-planter; Closer Look: Industry's first Multi-hybrid Planter; 2 pages; Oct. 16, 2014.
www.FarmProgress.com; Multi-hybrid planters: contrary view; 1 page; Aug. 2013.
Narrow Row Corn Report; 7 pages; 2009.
2013 Raven Industries, Inc.; www.ravenprecision.com; OMNIROW: Multi-Hybrid and Variable Rate Planting Solution; 3 pages.

*Primary Examiner* — Christopher J Novosad
(74) *Attorney, Agent, or Firm* — Rebecca L. Henkel; Rickard K. DeMille

(57) ABSTRACT

The present invention is directed to a twin-row planter configured to plant different seed types in different zones of an agricultural field. The planter may be a bulk-fill planter having multiple row segments with a pair of row units and a corresponding pair of seed meters at each row segment respectively receiving seeds of a first and a second type from centrally located compartments of a bulk fill tank(s) for planting in the different zones. A control system controls the planter to plant seeds of the first and/or second seed type based on which zone of the field the planter is planting at a given time. The control system primes the seed meters, making them ready for seed release, and maintains both seed meters at each row segment in a primed condition with the different seed types to allow for rapid switching between seed type deliveries when the planter reaches different zones of the field requiring different seed types.

17 Claims, 5 Drawing Sheets

TWIN-ROW MULTIPLE SEED-TYPE PLANTER

FIELD OF THE INVENTION

The invention relates generally to row-crop planters or seeders and, in particular, to seed meters of planters for planting multiple varieties of seed.

BACKGROUND OF THE INVENTION

Modern farming practices strive to increase yields of agricultural fields. Yields can be increased by increasing plant populations. Efforts have been made to increase plant populations by planting row crops with narrower row spacing, allowing more rows to be planted in a field, which may require harvesting with special equipment configured for harvesting narrow rows, such as narrow row heads for the harvesting implements. Twin-row planters have been developed that plant seeds as a pair of row segments that are closely width-spaced and longitudinally staggered at every row. Each pair of row segments is spaced from adjacent pairs of row segments at conventional row widths, allowing conventional heads to be used on the harvesting implements. Yet other efforts to increase yield include planting a single field with different seed varieties, based on variations of soil types and management zones such as irrigated and non-irrigated zones in the field.

SUMMARY OF THE INVENTION

The present invention is directed to a twin-row planter configured to plant different seed types in different zones of an agricultural field. The planter has multiple row segments with a pair of row units and a corresponding pair of seed meters at each row segment. At each row segment, a first seed meter of the pair receives and plants a first seed type and a second seed meter of the pair receives and plants a second seed type. A control system controls the planter to plant seeds of the first and/or second seed type based on which zone of the field the planter is planting at a given time. The control system primes the seed meters, making them ready for seed release, and maintains both seed meters at each row segment in a primed condition with the different seed types to allow for rapid switching between seed type deliveries when the planter reaches different zones of the field requiring different seed types. This is done by selectively activating and deactivating the seed meters with the different seed types.

According to one aspect of the invention, a method of planting multiple types of seed in a single planting pass during planting of an agricultural field with a twin-row planter is provided. A control system may be used for defining a first seed type and a second seed type. The first and second seed types are stored on the planter, such as in central bulk storage bins on the planter itself or towed along with the planter, or in on-row bulk storage hoppers. The first and second seed types are carried for being planted in respective first and second zones of an agricultural field. The first and second zones correspond to first and second characteristics of the agricultural field relating to at least one of soil type and management type. The planter has multiple planter row segments, each of which includes a pair of seed meters arranged transversely adjacent each other in a twin-row configuration. A first seed meter of the pair of seed meters is primed at each of the planter row segments with the first seed type. This is done by rotating a seed disk of the first seed meter through the first seed meter, with the seed disk picking up seeds of the first seed type that are singulated in the first seed meter. The seed disk of the first seed meter is held in a primed-ready-to-plant position in which the seed disk is held in a non-rotating position, with the singulated seeds carried by the seed disk maintained at spaced-apart locations on the seed disk. A second seed meter of the pair of seed meters is primed at each of the planter row segments with the second seed type. This is done by rotating a seed disk of the second seed meter through the second seed meter, with the seed disk picking up seeds of the second seed type that are singulated in the second seed meter. The seed disk of the second seed meter is held in a primed-ready-to-plant position in which the seed disk is held in a non-rotating position, with the singulated seeds carried by the seed disk maintained at spaced-apart locations on the seed disk. If the twin-row planter moves through the agricultural field along a travel path having a starting point within the first zone of the agricultural field, then the first seed meter is activated while the planter moves through the first zone. This is done by rotating the seed disk of the first seed meter for releasing seeds of the first seed type from the first seed meter onto the first zone of the agricultural field. While the seeds of the first seed type are being released from the first seed meter onto the first zone of the agricultural field, the second seed meter is deactivated by maintaining the seed disk of the second seed meter as held without rotating in the primed-ready-to-plant position. When the planter is moved farther along the travel path and crosses from the first zone into the second zone the agricultural field, while crossing from the first zone into the second zone, the second seed meter is activated and the first seed meter is deactivated. This is done by stopping rotation of the seed disk of the first seed meter and the holding of the seed disk of the first seed meter in the primed-ready-to-plant position while the seed disk of the second seed meter is rotated for releasing seeds of the second seed type from the second seed meter onto the second zone of the agricultural field.

According to another aspect of the invention, the first and second seed meters are pneumatic seed meters. Priming the first and second seed meters includes introducing a pneumatic pressure inside each of the first and second seed meters for directing seeds of the first and second seed types against the respective seed disks. When the first and/or second seed meter is deactivated, the pneumatic pressure may be maintained inside of the deactivated first and/or second seed meter. Each of the first and second seed meters may be a positive pressure pneumatic seed meter. While priming each of the first and second seed meters, a positive air pressure is introduced inside of the first and second seed meters, which pushes seeds of the first and second seed types into seed pockets of the respective seed disks. The positive air pressure may be maintained inside of the deactivated first and/or second seed meter to help hold the seeds in the seed pockets while the respective seed disk is maintained in the primed-ready-to-plant position. Each of the first and second seed meters may be a vacuum pressure pneumatic seed meter. While priming each of the first and second seed meters, a vacuum air pressure is introduced inside of the first and second seed meters, which pulls seeds of the first and second seed types into seed pockets of the respective seed disks. The vacuum air pressure may be maintained inside of the deactivated first and/or second seed meter to help hold the seeds in the seed pockets while the respective seed disk is maintained in the primed-ready-to-plant position.

According to another aspect of the invention, the deactivated seed meter may be monitored to detect an un-primed condition. The un-primed condition may occur when seeds fall out of the seed pockets of the seed disk in the deactivated seed meter. Monitoring may include detecting at least one empty seed pocket of the seed disk in the deactivated seed meter. This may be done by way of a sensor(s) inside a meter housing of the seed meter, arranged to detect presence of seeds in the seed pockets of the seed disk. If an un-primed condition is detected in the deactivated seed meter, then the deactivated seed meter may be re-primed. This may include rotating the seed disk of the deactivated seed meter to pick up and singulate the corresponding seeds. When the seed pockets of the seed disk are full, the seed disk is again held in the primed-ready-to-plant position. While re-priming the deactivated seed meter, the deactivated seed meter is temporarily activated as a re-priming temporary activation. During the re-priming temporary activation, the remaining seeds held in the seed disk are released at the same time as the release of seeds from the seed disk of the activated seed meter. This provides a relatively short period of twin-row planting during the re-priming temporary activation of the otherwise deactivated seed meter, in preference to a potential gap in seeding or skips and corresponding implanted segment which may have occurred upon activation of an un-primed seed meter.

According to another aspect of the invention, at each row segment, the first and second seed meters are longitudinally staggered with respect to each other. During a seed type switching event, the timing of deactivation and activation of the seed meters is coordinated to provide a purposeful double deactivation period in which both seed meters are simultaneously deactivated for a period of time or a purposeful double activation period in which both seed meters are simultaneously activated for a period of time to avoid discontinuity of seed release events and thus consistent spacing between the first and second seed types during the seed type switching event. The longitudinally staggered first and second seed meters may be provided with the first seed meter defining a forward seed meter arranged relatively closer to a front of the planter and the second seed meter defining a rearward seed meter arranged relatively farther from the front the planter. When the seed type switching event corresponds to stopping releasing seed of the first seed type from the forward seed meter and starting releasing seed of the second seed type from the rearward seed meter, the forward seed meter may be deactivated to define a last seed release location of the forward seed meter while maintaining the rearward seed meter deactivated until the rearward seed meter reaches the last seed release location of the forward seed meter. When the rearward seed meter reaches the last seed release location of the forward seed meter, then the rearward seed meter is activated. When the seed type switching event corresponds to stopping releasing seed of the second seed type from the rearward seed meter and starting releasing seed of the first seed type from the forward seed meter, the forward seed meter may be activated to define an initial seed release location of the forward seed meter. The rearward seed meter is maintained activated until the rearward seed meter reaches the initial release location of the forward seed meter. When the rearward seed meter reaches the initial seed release location of the forward seed meter, the rearward seed meter is deactivated.

According to another aspect of the invention, the first and second seed meters are primed by rotating their seed disks while applying pneumatic pressures inside the seed meters to direct seeds of the first and second seed types into seed pockets of the respective seed disks within the first and second seed meters. When the seed pockets are filled with seed, the seed disks stop rotating within the seed meters. The planter is moved through one of the first and second zones of the field to define a currently planted zone. Based on which one of the first and second zones is the currently planted zone, one of the seed meters is activated at each row segment of the planter. The activated seed meter releases its singulated seed onto the currently planted zone. The deactivated seed meter remains subjected to the internal pneumatic pressure to maintain the primed condition of the seed meter, but its seed disk does not rotate. The deactivated seed meter is monitored for detecting an un-primed condition by detecting at least one empty seed pocket of the seed disk in the deactivated seed meter. Upon detection of the un-primed condition of the deactivated seed meter, the deactivated seed meter is re-primed before it has to begin releasing seed at a boundary between the zones of the field, when the deactivated seed meter becomes activated at a seed type switching event.

According to another aspect of the invention, a twin-row planter is provided for planting multiple types of seed in a single planting pass during planting of an agricultural field. The planter includes a frame and a seed storage system supported by the frame. The seed storage system includes a first compartment storing seeds of a first type and a second compartment storing seeds of a second type to be correspondingly planted in first and second zones an agricultural field. Multiple row segments are supported by the frame. Each of the multiple row segments includes a first seed meter receiving seeds of the first type from the first compartment and has a first seed disk for rotating within the first seed meter to pick up seeds of the first type for moving the seeds through the first seed meter for delivery onto the first zone of the field. A second seed meter receives seeds of the second type from the second compartment and includes a second seed disk for rotating within the second seed meter to pick up seeds of the second type for moving the seeds through the second seed meter for delivery onto the second zone of the field.

A control system is operably connected to the first and second seed meters. The control system is configured to command priming of the first and second seed meters by rotating seed disks within the first and second seed meters to pick up and hold individual seeds from the respective seed disks, at which point the seed meters are in a primed condition. The control system identifies which of the first and second zones of the field will be planted first, defining an initial planting zone. The control system activates the first and a second seed meter that corresponds to the initial planting zone, defining an activated seed meter. The control system deactivates the other seed meter, defining a deactivated seed meter and preventing rotation of its seed disk while maintaining the primed condition of the deactivated seed meter while the planter plants the initial zone with the activated seed meter(s).

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
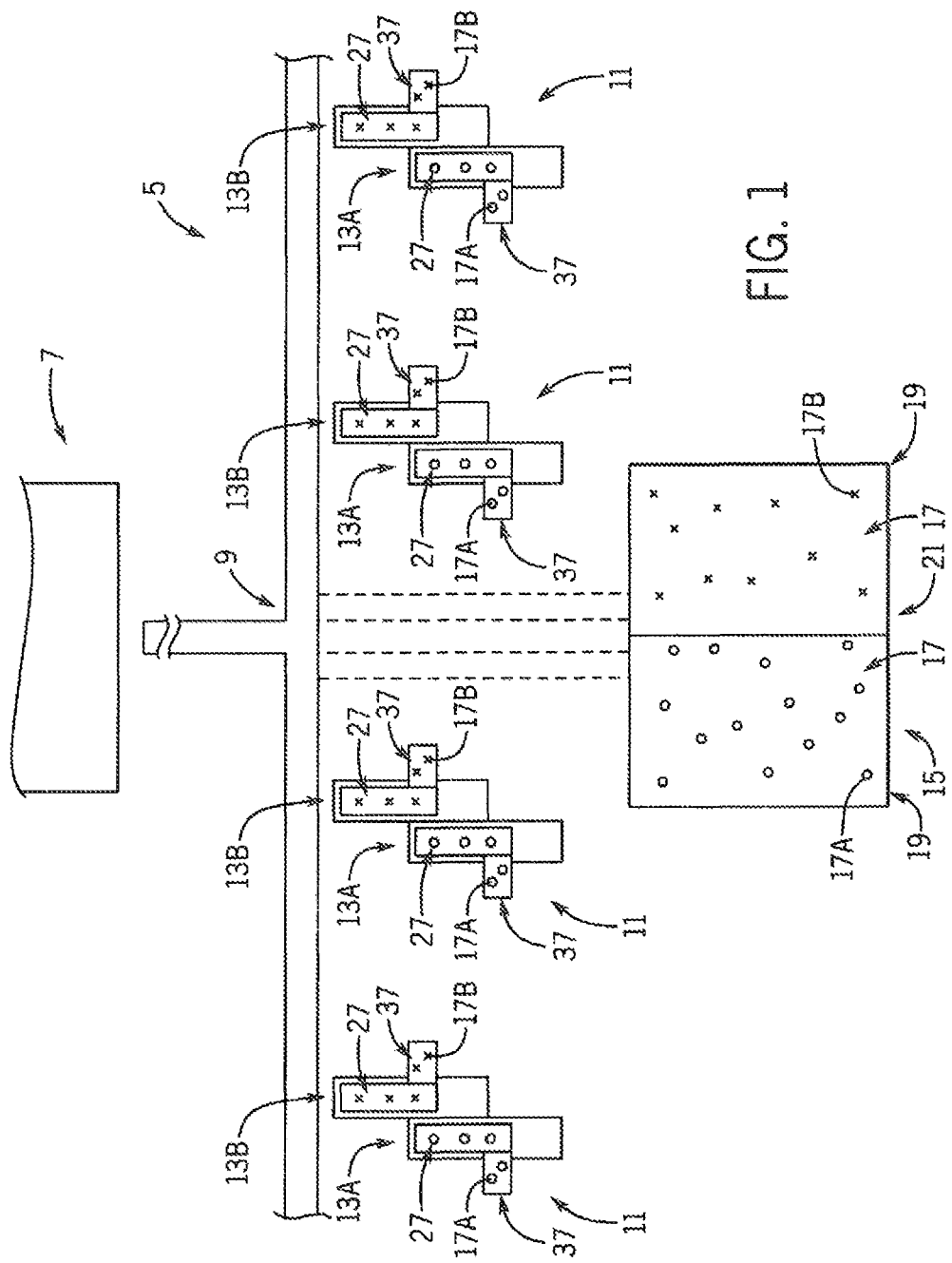
FIG. 1 illustrates a simplified schematic view of a twin-row planter planting multiple types of seed in accordance with the present invention.
Figure 2:
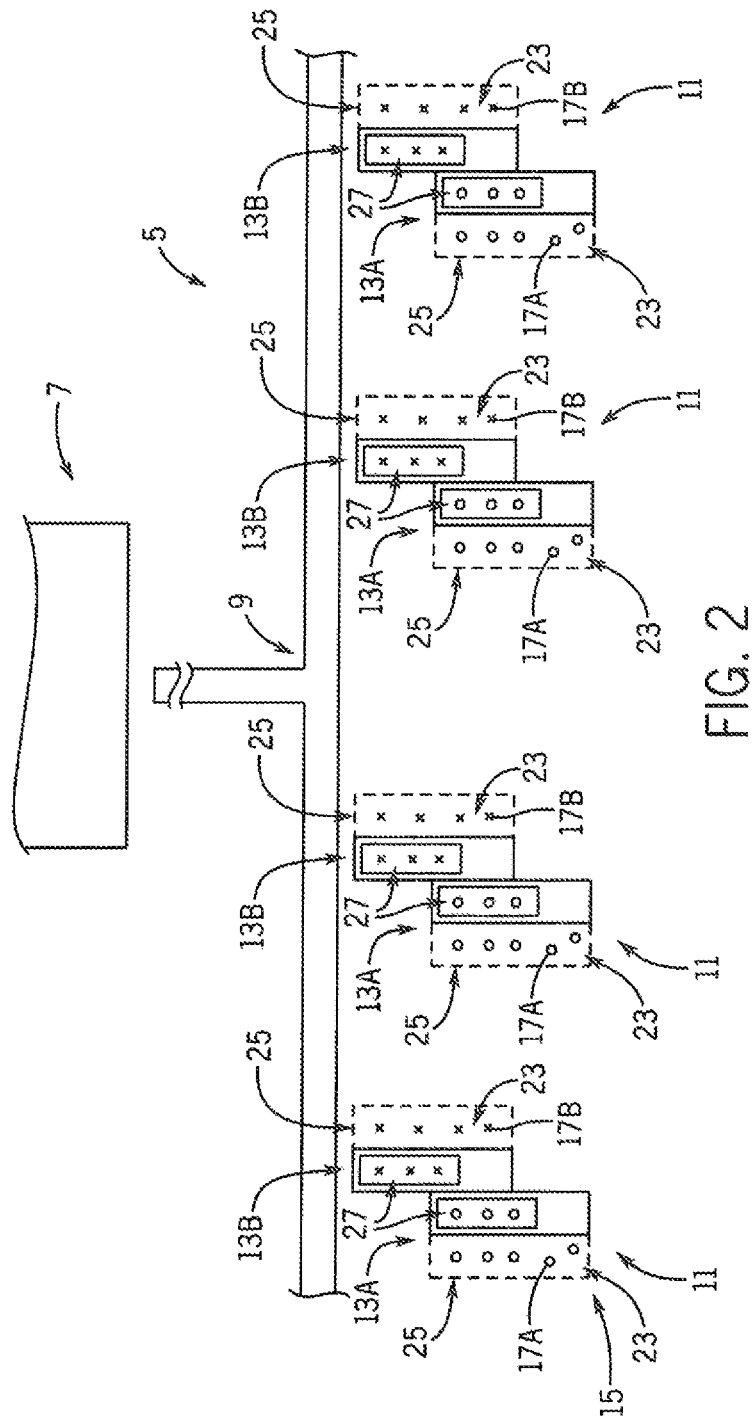
FIG. 2 illustrates a variant of the planter of FIG. 1.

Referring now to the drawings and specifically to the simplified schematic representations of FIGS. 1-2, a twin-row planter 5 is shown that is configured to plant different seed types onto different zones of an agricultural field. The planter 5 may be or may include components of planters available from Case IH, such as the EARLY RISER® series planters and/or the twin-row planters such as models Twin-Row4025A3PS, 1225AFF, 1625AFF, and 825A3PM, also available from Case IH. The planter 5 is towed behind a tractor 7 and has a frame 9 that supports multiple row segments 11 that are substantially identical. Each row segment 11 has a twin-row configuration, with a pair of row units as first row unit 13A and second row unit 13B. In each row segment 11, the row units 13A, 13B and their components are arranged transversely adjacent each other and are shown as longitudinally staggered with respect to each other. In this way, the first row unit 13A shown at the left-hand side of each row segment 11 defines a rearward row unit 13A arranged relatively farther from the front the planter 5 and the second row unit 13B shown at the right-hand side of each row segment 11 defines a forward row unit 1311 arranged relatively closer to a front of the planter 5. Each row unit 13A. 13B has ground-engaging tools (not shown) that may include opening and closing mechanisms such as opener disks and closing disks, respectively or other ground-engaging tools for opening and closing a furrow. The ground-engaging tools may also include a gauge wheel configured for adjusting furrow depth by limiting soil penetration of the furrow-opening mechanism of the ground-engaging tools while creating a furrow, and a press wheel may be arranged to roll over the closed furrow to firm the soil over the seed to further close the furrow and promote favorable seed-to-soil contact.

Figure 4:
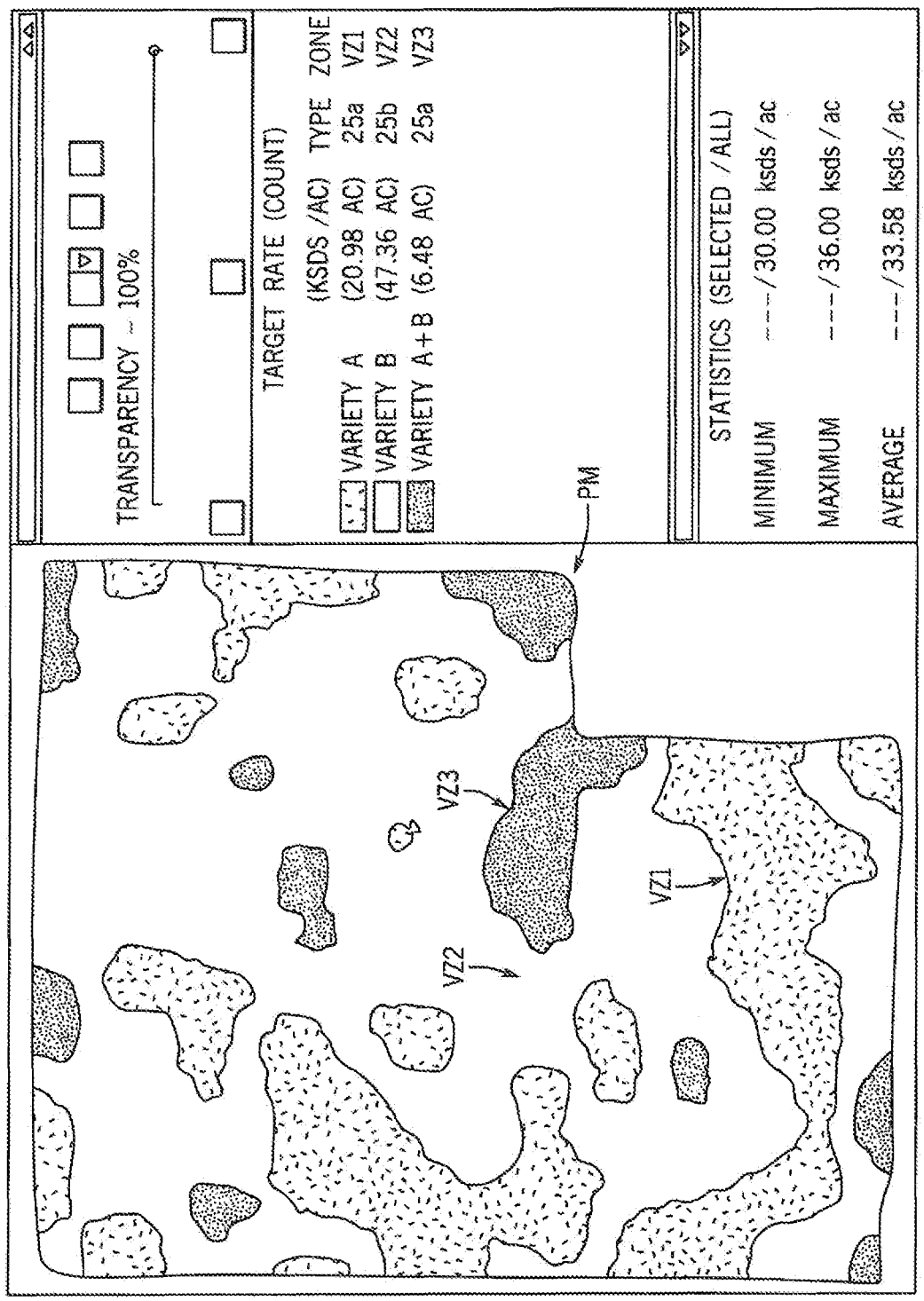
FIG. 4 illustrates a screen shot showing a seed-type prescription map for use with the planter in accordance with the present invention.

Still referring to FIGS. 1 and 2, a seed storage system 15 is supported by the frame 9 for bulk storage of seeds 17 of a first seed type 17A and a second seed type 17B for planting in different type or variety zones, shown as zones VZ1, VZ2, VZ3 in the prescription map PM of FIG. 4. The different type or variety zones VZ1, VZ2, VZ3 of the agricultural field are defined at least in part by characteristics relating to at least one of soil type and management type. Although the seed 17 may be described elsewhere herein as different types 17A, 17B, it is understood that the description of the different types includes different varieties. In other words, the different types 17A, 17B of seed 17 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide-tolerant seed, or other different products. The different seed products can further include different crop seeds such as corn and soybeans.

Still referring to FIGS. 1 and 2, the seed storage system 15 of the planter 5 shown in FIG. 1 is configured as a central bulk storage system with compartments 19 separated from each other by a divider wall within a bulk fill tank 21 and separately holding the seed types 17A, 17B. Instead of two compartments 19 in a single bulk fill tank 21, the central bulk storage system can have two separate bulk fill tanks 21 for separately holding the seed types 17A, 17B. The central bulk storage system as the seed storage system 15 pneumatically delivers the seeds 17A, 17B from the compartments 19 of the bulk fill tank(s) 21 to the row units 13A, 13B. The seed storage system 15 of the planter 5 shown in FIG. 2 is configured as an on-row bulk storage system with compartments 23 defined within bulk on-row hoppers 25 holding the seed types 17A, 17B at the row units 13A, 13B, respectively.

Figure 3:
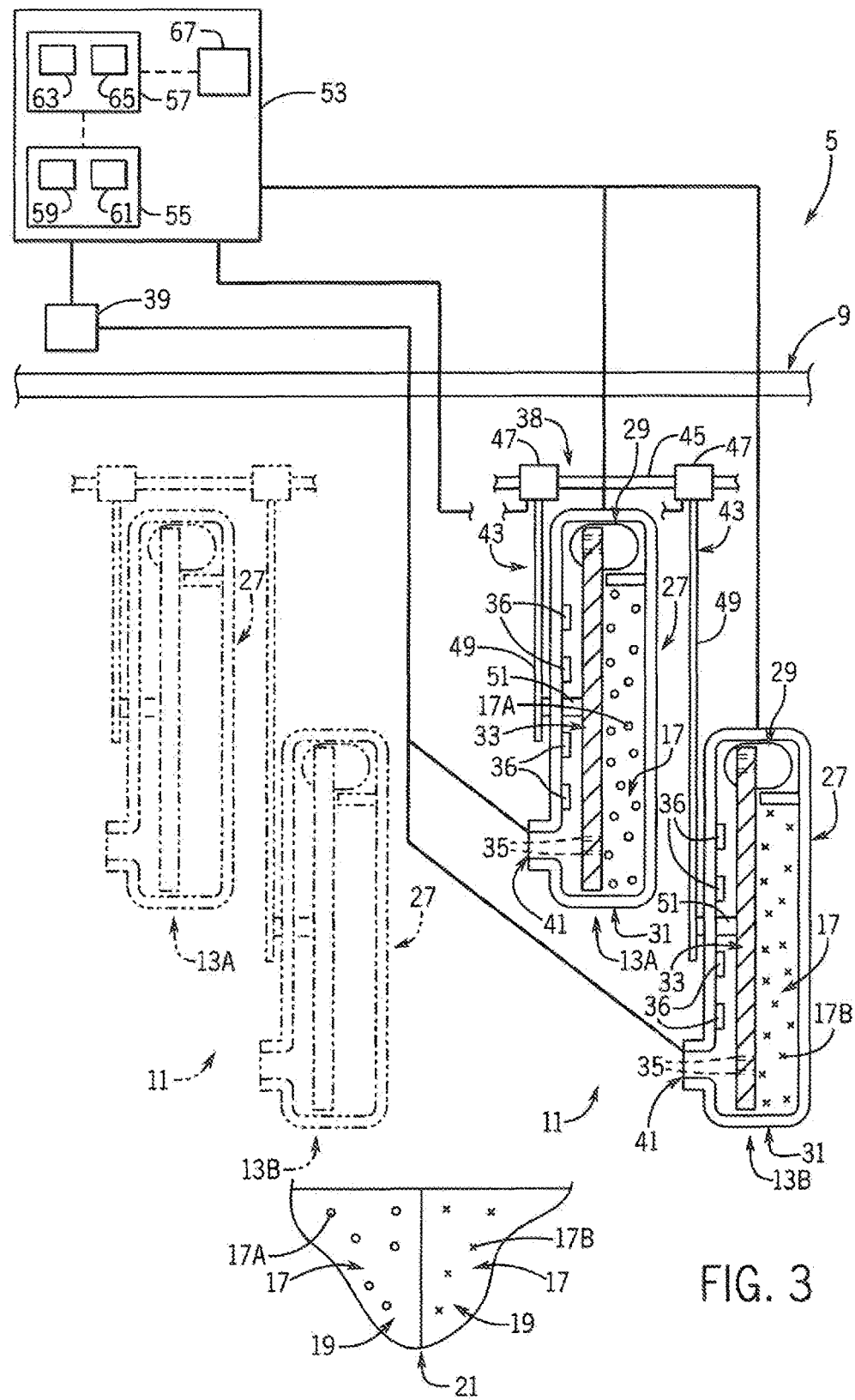
FIG. 3 illustrates a simplified schematic view of a portion of the planter of FIG. 1.

Referring now to FIGS. 1-3, at each row segment 11, each row unit 13A, 13B includes a seed meter 27 that singulates and delivers individual seeds 17 through a seed tube 29 extending from a meter housing 31 of the seed meter 27 to the field. Referring now to FIG. 3, each seed meter 27 includes an internal seed disk 33 with seed pockets 35 for picking up and carrying the individual seeds 17 through the seed meter 27. Each seed disk 33 is rotated by a seed disk drive system 38 to rotate the seed disk 33 through a seed pool inside of the seed meter 27 to expose the seed pockets 35 to the seeds 17 in the seed pool to pick up the seeds 17 in the seed pockets 35. Although shown as extending axially through or between opposing surfaces of the seed disk 33, the seed pockets 35 may extend at least partially into an outer circumferential surface of the seed disk 33. At least one seed sensor 36 is inside the meter housing 31 of the seed meter 27 to detect presence or absence of seeds 17 in the seed pockets 35 of the seed disk 33. The sensor(s) 36 can be infrared and/or other sensors configured to detect the presence or absence of the seed 17 in the seed pockets 35, such as optical sensors configured to detect light passing through the empty seed pockets 35. The seed meters 27 can be purely mechanical—type seed meters 27 or can be pneumatic seed meters 27. Pneumatic seed meters 27 are operatively connected to an airflow system 39 that may include a positive air pressure source and/or a vacuum source for establishing positive and/or vacuum pressures and corresponding air flows for operation of seed meters 27 at the row units 13A, 13B. The positive air pressure source and vacuum sources can be known pumps, fans, blowers, and/or other known airflow system components. When the seed storage system 15 is configured with a central bulk storage system (FIG. 1), the airflow system 39 includes a seed conveyance airflow system providing an airflow that entrains seeds 17 to move the seeds 17 from bulk storage in the compartments 19 of the bulk fill tank(s) 21 through seed conduits to the row units 13A, 13B, such as to mini-hoppers 37 (FIG. 1) at the row units 13A, 13B that feed the seed meters 27. When the seed meters 27 are positive pressure pneumatic seed meters 27, the airflow system 39 is configured to provide a positive airflow and a corresponding positive pressure within the seed meters 27 to push and hold seeds 17 into the seed pockets 35 of the seed disks 33 by positive pressure through introducing pressurized air through an air inlet (not shown) of the meter housing 31. When the seed meters 27 are vacuum pressure pneumatic seed meters 27, the airflow system 39 is configured to provide a vacuum airflow and a corresponding negative pressure within the seed meters 27 to pull and hold the seeds 17 in the seed pockets 35 of the seed disks 33 by vacuum pressure introduced through a vacuum air inlet 41 through which air is evacuated from the meter housing 31.

Still referring to FIG. 3, the seed disk drive system 38 is configured to allow the seed meters 27 at the row units 13A, 13B of each row segment 11 to be separately controlled for individual activation and deactivation to selectively release a specific seed type(s) 17A, 17B based on which zone VZ1, VZ2, VZ3 is being planted at a given time. The seed disk drive system 38 is shown with mechanical chain drives 43 that deliver rotating driving power from a rotating shaft 45 through clutches 47 and chains 49, which rotate sprockets that are attached to spindles 51 that drive rotation of the seed disks 33. The rotating shaft 45 is driven from the ground through movement of the planter 5, such as by a traction-drive-type drive wheel, ground-engaging drive sprocket, or may be rotated by a motor such as an electric motor, pneumatic motor, or hydraulic motor. Clutches 47 may be, for example, air clutches or electromechanical clutches, configured to selectively transmit rotation of or prevent transmission of rotation of the shaft(s) 45 to the seed disks 33, coupling or uncoupling power between the shaft(s) 45 and the seed disks 33. The seed disk drive system 38 can instead be an electric direct drive system that uses an electric motor to directly rotate the seed disk 33 or rotate its supporting hub or spindle 51. Rotating one of the seed disks 33, such as by engaging its corresponding clutch 47, activates the seed meter 27 at the respective row unit 13A, 13B of each row segment 11. Stopping rotation one of the seed disks 33, such as by disengaging its corresponding clutch 47, deactivates the seed meter 27 at the respective row unit 13A, 13B of each row segment 11.

Still referring to FIG. 3, a control system 53 controls the individual seed meters 27 at each of the row segments 11 to selectively release a specific seed type(s) 17A, 17B based on which zone VZ1, VZ2, VZ3 (FIG. 4) is being planted at a given time. The control system 53 can maintain each seed meter 27 of both row units 13A, 13B at each of the row segments 11 in a primed condition, regardless of which seed meter 27 is releasing seeds 17, facilitating rapidly changing which seed meter 27 releases its seed type 17A, 17B based on which zone VZ1, VZ2, VZ3 is being planted, as explained in greater detail elsewhere herein. The control system 53 is operably connected to each of the clutches 47 to either disengage and prevent transmission of the rotation driving power from the shaft 45 or engage and permit transmission of the rotation driving power from the shaft 45 to each of the seed disks 33 in each of the seed meters 27 of the row units 13A, 13B at each row segment 11. Control system 53 includes a planter controller 55 and a tractor controller 57 that operably communicate with each other, for example, by way of an ISOBUS connection, for coordinating controls of planter 5 such as the seed meters 27, the seed disk drive system 38 and airflow system 39 and tractor 7 (FIG. 1) based on the type or variety zones VZ1, VZ2, VZ3 of the agricultural field, which may correspond to a seed type or variety prescription map PM as shown in FIG. 4. The planter controller 55 is shown including a controller 59 and a power supply 61. The controller 59 of the planter controller 55 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meters 27 and seed disk drive system 38 and other components of the planter 5. The tractor controller 57 is configured for controlling operations of the tractor 7 such as controlling steering, speed, braking, shifting, and other operations of the tractor 7. The tractor controller 57 is shown as including a controller 63 and power supply 65. The tractor controller 57 is configured for controlling the functions of the tractor 7 by controlling the various GPS steering, transmission, engine, hydraulic, and/or other systems of the tractor 7. Like the controller 59 of the planter controller 55, the controller 63 of the tractor controller 57 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 7. A tractor interface system 67 is operably connected to the tractor controller 57 and includes a monitor and various input devices to allow an operator to see the statuses and control various operations of the tractor 7 from within the cab of the tractor 7. The tractor interface system 67 may be a MultiControl Armrest™ console available for use with the Maxxum™ or Magnum™ series tractors from Case IH.

The control system 53 controls priming, maintaining primed conditions, and activating and deactivating the seed meters 27 of the row units 13A, 13B at each row segment 11 for selectively planting the zones VZ1, VZ2, VZ3 with the corresponding seed types 17A, 17B. The control system 53 primes the seed meters 27, making them ready for seed release, and maintains both seed meters 27 at each row segment in a primed condition with the different seed types 17A, 17B to facilitate rapidly switching between seed type deliveries when the planter crosses from one zone VZ1, VZ2, VZ3 to another zone VZ1, VZ2, VZ3 by selectively activating and deactivating the various seed meters 27 at each row segment 11.

Referring now to FIGS. 3 and 4, when using the planter 5, Referring now to FIGS. 3 and 4, during use, an operator first displays the seed type or variety prescription map PM (FIG. 4) on the computer display or monitor of the tractor interface system 67, which would typically be inside the tractor cab. The prescription map PM displays which type or variety zones VZ1, VZ2, VZ3 are where in the agricultural field and which seed types 17A, 17B can be planted in the variety zones VZ1, VZ2, VZ3. As shown in FIG. 4, in this embodiment, seed type 17A is shown as acceptable for use in variety zone VZ1, shown labeled as VARIETY A in the screen shot. Seed type 17B is shown as acceptable for use in variety zone VZ2, shown labeled as VARIETY B in the screen shot. Both seed types 17A, 17B are shown as acceptable for simultaneous twin-row planting in variety zone VZ3, shown labeled as VARIETY A+B in the screen shot. This variety zone VZ3 may correspond to field characteristics in that particular zone VZ3 that potentially benefit more from a relatively greater population density of twin-row application than for the benefits of either seed type 17A, 17B as a single row application. The operator inputs which seed type 17A, 17B is stored in compartments 19 of the bulk fill tank(s) 21 of the seed storage system 15 as a central bulk storage system and in which row unit 13A, 13B at each row segment 11 receives seeds 17A, 17B from the respective compartments 19 (FIG. 1). When the seed storage system 15 is configured as an on-row bulk storage system, the operator inputs which seed type 17A, 17B is stored in compartments 23 of the on-row hoppers 25 at the row units 13A, 13B at each row segment 11 (FIG. 2).

Figure 5:
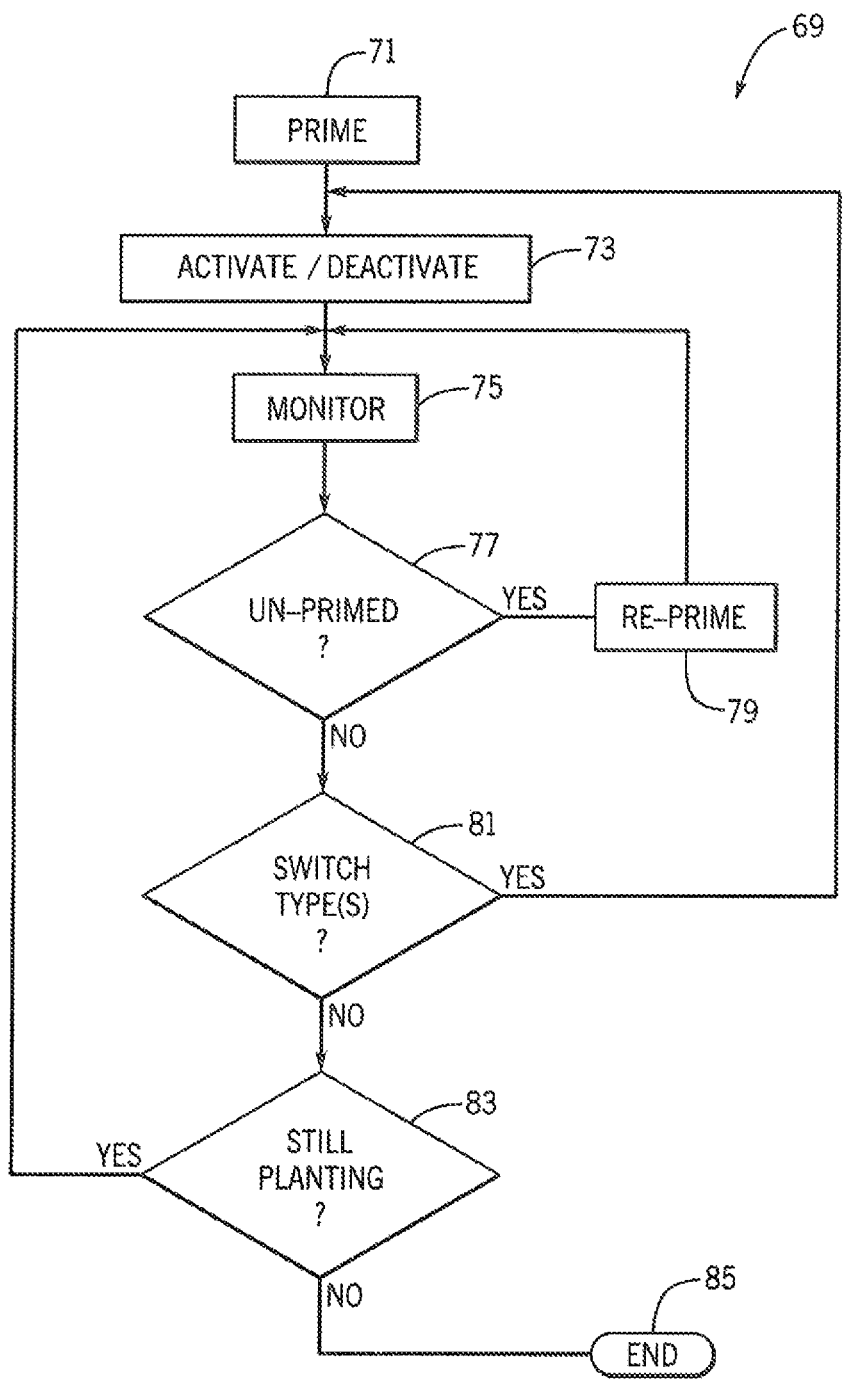
FIG. 5 is a flowchart of a use of the planter in accordance with the present invention.

Referring now to FIGS. 3 and 5, one embodiment of using the planter 5 for selectively planting multiple seed types 17A, 17B in multiple zones VZ1, VZ2, VZ3 is schematically represented as method 69. As represented at block 71, the control system 53 primes the seed meters 27. For pneumatic seed meters 27, this includes controlling the airflow system 39 and the seed meters 27 to introduce pneumatic pressure inside of the seed meters 27 while controlling the seed disk drive system 38 to rotate the seed disks 33 inside of the meter housing 31. When the seed meters 27 are positive air pressure pneumatic seed meters 27, a positive air pressure is introduced inside of the first and second seed meters 27 at the row units 13A, 13B of each row segment 11. This pushes seeds 17 of the first and second seed types 17A, 17B into seed pockets 35 of the respective seed disks 33. When the seed pockets 35 are full of seeds 17, the control system 53 can command stopping rotation of the seed disks 33 while maintaining the positive air pressure inside the seed meters 27, defining a primed condition of each of the seed meters 27 and a primed-ready-to-plant position of the seed disks 33. When the seed meters 27 are vacuum pressure pneumatic seed meters 27, a vacuum pressure is introduced inside of the first and second seed meters 27 at the row units 13A, 13B of each row segment 11. This pulls seeds 17 of the first and second seed types 17A, 17B into seed pockets 35 of the respective seed disks 33. The control system 35 commands stopping rotation of the seed disks 33 while maintaining the vacuum air pressure inside the seed meters 27 of the seed meters 27 for holding the seed disks 33 in the non-rotating primed-ready-to-plant position when the seed meters 27 are primed.

Still referring to FIGS. 3 and 5, as represented at block 73, the control system 53 identifies which of the zones VZ1, VZ2, VZ3 of the field will be planted first defining an initial planting zone. This may be done, for example, by evaluating a position and heading or travel direction of the tractor 7 with respect to the zones VZ1, VZ2, VZ3. The control system 53 activates the seed meter 27 of the row unit(s) 13A, 13B that delivers the seed type 17A, 17B that corresponds to the initial planting zone, defining an activated seed meter 27 as the seed meter 27 delivering the currently planted seed type 17A, 17B. The control system 53 controls the seed disk drive system 38 to rotate the seed disk 33 in the activated seed meter 27 at the corresponding activated row unit 13A, 13B for releasing the currently planted seed type seed type 17A, 17B onto the initial planting zone. The control system 53 deactivates the other seed meter 27, defining a deactivated seed meter 27, by commanding the seed disk drive system 38 to prevent rotation of the seed disk 33 of the deactivated seed meter 27 at the corresponding de activated row unit 13A, 13B while the planter plants the initial zone VZ1, VZ2, VZ3 with the activated seed meter(s) 27. In this way, the activated seed meter 27 of the activated row unit 13A, 13B at each row segment 11 releases its singulated seed 17A, 17B onto the currently planted zone VZ1, VZ2, VZ3. For pneumatic pressure seed meters 27, the deactivated seed meter 27 of the deactivated row unit 13A, 13B at each row segment 11 remains subjected to the internal pneumatic pressure to maintain the primed condition of the seed meter 27, but its seed disk 33 does not rotate.

Still referring to FIGS. 3 and 5, as represented at blocks 75 and 77, in one embodiment, in addition to controlling other planter 5 operations, the control system 53 monitors the deactivated seed meter 27 to detect an un-primed condition by detecting presence of empty seed pockets 35 indicating that at least some of the seeds 17A, 17B have fallen out of seed pockets 35 of the seed disk 33 in the deactivated seed meter 27. The control system 53 evaluates signals from the seed sensor(s) 36 to determine whether a seed pocket(s) 35 that should have seed is instead empty. If the control system 53 determines that the deactivated seed meter 27 is in an un-primed condition, then the control system 53 commands re-priming the un-primed seed meter 27, as represented by block 79. To do this, the control system 53 controls the seed disk drive system 38 to rotate the seed disk 33 in the un-primed deactivated seed meter 27 at the corresponding deactivated row unit 13A, 13B, while maintaining pneumatic pressure inside of the meter housing 31 for pneumatic seed meters 27. This temporarily activates the deactivated seed meter 27 as a re-priming temporary activation while the activated seed meter 27 continues planting the currently planted seed type 17A, 17B onto the currently planted zone VZ1, VZ2, VZ3. This provides a relatively short period of twin-row planting during the re-priming temporary activation of the deactivated seed meter 27. After the re-priming temporary activation of the deactivated seed meter 27, the deactivated seed meter 27 is again monitored by control system 53 as represented at block 75. In this way, the deactivated seed meter 27 can be continuously monitored by the control system 53 and periodically re-primed as necessary. This provides a seed disk 33 in the deactivated seed meter 27 with seed pockets 35 carrying seeds 17A, 17B and held in the primed-ready-to-plant position before the deactivated seed meter 27 has to begin releasing seed at a boundary between the zones VZ1, VZ2, VZ3 of the field, at which point the deactivated seed meter 27 becomes activated at a seed type switching event, represented at block 81.

Still referring to FIGS. 3 and 5, during the seed type switching event at block 81, in one embodiment in which the row units 13A, 13B and thus the seed meters 27 of each row segment 11 are longitudinally staggered with respect to the planter 5, during the seed switching event, the timing of deactivation and activation of the seed meters 27 of the row units 13A, 13B at each row segment 11 can be coordinated to provide a purposeful double deactivation period or activation period to provide a to-ground transition between seed types 17A, 17B without gaps or skips. Control system 53 commands a double deactivation to deactivate both seed meters 27 of the row units 13A, 13B at each row segment 11 when the seed type switching event corresponds to stopping releasing seed of the first seed type 17A from the forward seed meter 27 of the forward row unit 13A and starting releasing seed of the second seed type 17B from the rearward seed meter 27 of the rearward row unit 13B of the row segment 11. In this way, the forward seed meter 27 of the forward row unit 13A is deactivated by the control system 53 to define a last seed release location of the forward seed meter 27 of the forward row unit 13A while maintaining rearward seed meter 27 of the rearward row unit 13B deactivated until its seed meter 27 meter reaches the last seed release location of the forward seed meter. When rearward seed meter 27 of the rearward row unit 13B reaches the last seed release location of forward seed meter 27 of the forward row unit 13A, then the rearward seed meter 27 of the rearward row unit 13B is activated. Control system 53 commands a double activation to activate both seed meters 27 of the row units 13A, 13B at each row segment 11 when the seed type switching event corresponds to stopping releasing seed of the second seed type 17B from the rearward seed meter 27 of the rearward row unit 13B and starting releasing seed of the first seed type 17A from the forward seed meter 27 of the forward row unit 13A of the row segment 11. In this type of seed type switching event, forward seed meter 27 of the forward row unit 13A is activated to begin releasing the first seed type 17A while the second seed type 17B finishes being released. The beginning release of the first seed type 17A defines an initial seed release location of the forward seed meter 27 of the forward row unit 13A. The control system 53 maintains activation of the rearward seed meter 27 of the rearward row unit 13B until its seed meter 27 reaches the initial release location of the forward seed meter 27 of the forward row unit 13A. When the rearward seed meter 27 of the rearward row unit 13B reaches the initial seed release location of the forward seed meter 27 of the forward row unit 13A, the rearward seed meter 27 of the rearward row unit 13B is deactivated. Activating and deactivating the seed meters 27 during seed type switching events can be visually confirmed by the operator from within the tractor 7 because the seed type 17A should be planted left of center of the centerline at each of the row segments 11 and the seed type 17B should be planted right of center of the centerline at each of the row segments 11. As represented at block 83, the control system 53 evaluates whether the planter 5 is still planting, which may include evaluating movement of the printer 5 to the field and/or may require operator confirmation through the tractor interface system 67 (FIG. 3). If planting is still underway, and a control system 53 continues to monitor the deactivated seed meter 27 for identification of an unprimed condition at block 75 or planting is finished, then the process ends as represented at block 85.

Referring again to FIGS. 1-3, the control system 53 can be configured to individually control each of the seed meters 27 in this way to control switching between planting seed types 17A, 17B on a per-row basis and thus at each row segment 11. In another embodiment, the control system 53 is configured to control groups of seed meters 27 in the same way within a common section of the planter 5, for example, by giving common commands to all of the seed meters 27 within the same outer wing section(s) and/or inner or middle sections, optionally, by giving common commands to all of the row segments 11 to switch between planting the seed types 17A, 17B on a whole-planter basis.

Many changes and modifications could be made to the invention without departing from the spirit thereof. The scope of these changes will become apparent from the appended claims.

We claim:

1. A method of planting multiple types of seed in a single planting pass during planting of an agricultural field with a twin-row planter, the method comprising:
   defining a first seed type and a second seed type stored with respect to a twin-row planter to be correspondingly planted in a first zone and a second zone of an agricultural field, wherein the first and second zones correspond to first and second characteristics of the agricultural field relating to at least one of soil type and management type, wherein the twin-row planter includes multiple planter row segments for planting multiple crop rows within the agricultural field and wherein each of the row segments includes a pair of seed meters;
   positioning a first seed meter of the pair of seed meters of each row segment adjacent a second seed meter of the pair of seed meters of each row segment at a location transversely and longitudinally spaced from the second seed meter of the pair of seed meters of each row segment;
   priming the first seed meter of the pair of seed meters at each of the planter row segments with the first seed type by rotating a seed disk of the first seed meter through the first seed meter picking up and singulating seeds of the first seed type;
   holding the seed disk of the first seed meter in a primed-ready-to-plant position wherein the seed disk is held in a non-rotating position with the singulated seeds carried by the seed disk at spaced-apart locations on the seed disk;
   priming the second seed meter of the pair of seed meters at each of the planter row segments with the second seed type by rotating a seed disk of the second seed meter through the second seed meter picking up and singulating seeds of the second seed type;
   holding the seed disk of the second seed meter in a primed-ready-to-plant position wherein the seed disk is held in a non-rotating position with the singulated seeds carried by the seed disk at spaced-apart locations on the seed disk;
   moving the twin-row planter through the agricultural field along a travel path having a starting point within the first zone of the agricultural field;
   activating the first seed meter while moving the twin-row planter along the travel path through the first zone by rotating the seed disk of the first seed meter for releasing seeds of the first seed type from the first seed meter onto the first zone of the agricultural field; and
   deactivating the second seed meter by maintaining the holding of the seed disk of the second seed meter in the primed-ready-to-plant position while releasing the seeds of the first seed type from the first seed meter onto the first zone of the agricultural field.

2. The method of claim 1, further comprising moving the twin-row planter through the agricultural field along the travel path crossing from the first zone into the second zone of the agricultural field and, while crossing from the first zone into the second zone, deactivating the first seed meter by stopping rotation of the seed disk of the first seed meter and the holding of the seed disk of the first seed meter in the primed-ready-to-plant position and activating the second seed meter by rotating the seed disk of the second seed meter for releasing seeds of the second seed type from the second seed meter onto the second zone of the agricultural field.

3. The method of claim 2, wherein at each of the row segments, each of the first and second seed meters is a pneumatic seed meter, and wherein while priming each of the first and second seed meters, pneumatic pressure is introduced inside of each of the first and second seed meters for directing seeds of the first and second seed types against the respective seed disks.

4. The method of claim 3, wherein each of the first and second seed meters is a positive pressure pneumatic seed meter, and wherein while priming each of the first and second seed meters, a positive air pressure is introduced inside of each of the first and second seed meters for pushing seeds of the first and second seed types into seed pockets of the respective seed disks.

5. The method of claim 3, wherein each of the first and second seed meters is a vacuum pressure pneumatic seed meter, and wherein while priming each of the first and second seed meters, a vacuum air pressure is introduced inside of each of the first and second seed meters for pulling seeds of the first and second seed types into seed pockets of the respective seed disks.

6. The method of claim 3, wherein at each of the row segments, while one of the first and second seed meters is deactivated, the pneumatic pressure is maintained within the one of the first and second seed meters while the respective seed disk is held in the primed-ready-to-plant position.

7. The method of claim 6, wherein each of the first and second seed meters is a positive pressure pneumatic seed meter, and wherein while the one of the first and second seed meters is deactivated, a positive air pressure is maintained within the one of the first and second seed meters to maintain seeds of corresponding one of the first and second seed types in seed pockets of the respective seed disk.

8. The method of claim 6, wherein each of the first and second seed meters is a vacuum pressure pneumatic seed meter, and wherein while the one of the first and second seed meters is deactivated, a vacuum air pressure is maintained within the one of the first and second seed meters to maintain seeds of corresponding one of the first and second seed types in seed pockets of the respective seed disk.

9. The method of claim 2, further comprising monitoring the deactivated one of the first and second seed meters and detecting an un-primed condition of the deactivated one of the first and second seed meters.

10. The method of claim 9, wherein the detecting of an un-primed condition of the deactivated one of the first and second seed meters includes detecting at least one empty seed pocket of the respective seed disk of the deactivated one of the first and second seed meters.

11. The method of claim 10, further comprising re-priming the un-primed deactivated one of the first and second seed meters.

12. The method of claim 11, wherein re-priming the un-primed deactivated one of the first and second seed meters includes rotating the respective seed disk of the deactivated one of the first and second seed meters and picking up and singulating seeds of the corresponding one of the first and second seed types and holding the respective seed disk in the primed-ready-to-plant position.

13. The method of claim 12, wherein while re-priming the un-primed deactivated, one of the first and second seed meters, the deactivated one of the first and second seed meters is temporarily activated as a re-priming temporary activation for releasing seeds remaining on the respective seed disk while rotating through the respective one of the first and second seed meters until achieving a fully re-primed condition at which time the respective seed disk in the primed-ready-to-plant position.

14. The method of claim 2, wherein at each of the row segments, the first and second seed meters are longitudinally staggered with respect to each other along the length of the respective row segment with the first seed meter defining a forward seed meter arranged relatively closer to a front of the planter and the second seed meter defining a rearward seed meter arranged relatively farther from the front of the planter and wherein while performing a seed type switching event for changing which of the first and second seed meters is activated, when the seed type switching event corresponds to stopping releasing seed of the first seed type from the forward seed meter and starting releasing seed of the second seed type from the rearward seed meter, the method includes deactivating the forward seed meter to define a last seed release location of the forward seed meter while maintaining the rearward seed meter deactivated until the rearward seed meter reaches the last seed release location of the forward seed meter and activating the rearward seed meter upon the rearward seed meter reaching the last seed release location of the forward seed meter; and when the seed type switching event corresponds to stopping releasing seed of the second seed type from the rearward seed meter and starting releasing seed of the first seed type from the forward seed meter, the method includes activating the forward seed meter to define an initial seed release location of the forward seed meter while maintaining the rearward seed meter activated until the rearward seed meter reaches the initial release location of the forward seed meter and deactivating the rearward seed meter upon the rearward seed meter reaching the initial seed release location of the forward seed meter.

15. A method of planting multiple types of seed in a single planting pass during planting of an agricultural field with a twin-row planter, the method comprising:

defining a first seed type and a second seed type stored with respect to a twin-row planter to be correspondingly planted in a first zone and a second zone of an agricultural field, wherein the first and second zones correspond to first and second characteristics of the agricultural field relating to at least one of soil type and management type, wherein the twin-row planter includes multiple planter row segments for planting multiple crop rows within the agricultural field and wherein each of the row segments includes a first seed meter for planting seeds of the first type and a second seed meter for planting seeds the second type;

positioning the first seed meter of the pair of seed meters of each row segment adjacent the second seed meter of the pair of seed meters of each row segment at a location transversely and longitudinally spaced from the second seed meter of the pair of seed meters of each row segment;

priming the first and second seed meters by rotating seed disks within the first and second seed meters while applying pneumatic pressures inside of the first and second seed meters to direct seeds of the first and second seed types into seed pockets of the respective seed disks of the first and second seed meters until the seed pockets of the seed disks of the first and second seed meters are full of seeds of the respective first and second seed types;

moving the planter through one of the first and second zones to define a currently planted zone, activating and releasing seed from one of the first and second seed meters to define an activated seed meter corresponding to the one of the first and second zones defining the currently planted zone;

deactivating the other one of the first and second seed meters that does not correspond to the one of the first and second zones defining the currently planted zone to define a deactivated seed meter, wherein the seed disk of the deactivated seed meter is held without rotation in the deactivated seed meter while application of the pneumatic pressure inside the deactivated seed meter is maintained, maintaining the deactivated seed meter in a primed condition;

monitoring the deactivated seed meter for detecting an un-primed condition of the deactivated seed meter by detecting at least one empty seed pocket of the seed disk of the deactivated seed meter and, upon detection of the un-primed condition of the deactivated seed meter, re-priming the deactivated seed meter before a seed type switching event during which the activated seed meter becomes deactivated and the deactivated seed meter becomes activated while the planter crosses from the one of the first and second zones defining the currently planted zone to the other one of the first and second zones.

16. The method of claim 15, wherein each of the first and second seed meters is a positive pressure pneumatic seed meter, and wherein while priming each of the first and second seed meters, a positive air pressure is introduced inside each of the first and second seed meters for pushing seeds of the first and second seed types into the seed pockets of the respective seed disks.

17. The method of claim 15, wherein each of the first and second seed meters is a vacuum pressure pneumatic seed meter, and wherein while priming each of the first and second seed meters, a vacuum air pressure is introduced inside of each of the first and second seed meters for pulling seeds of the first and second seed types into the seed pockets of the respective seed disks.

* * * * *